United States Patent [19]

Stephens

[11] Patent Number: 4,672,575

[45] **Date of Patent: * Jun. 9, 1987**

[54] SCHEMATIC BUILDING CURSOR CHARACTER

[75] Inventor: Lawrence K. Stephens, Dallas, Tex.

[73] Assignee: International Business Machines Corp., Armonk, N.Y.

[ * ] Notice: The portion of the term of this patent subsequent to Nov. 26, 2002 has been disclaimed.

[21] Appl. No.: 499,458

[22] Filed: May 31, 1983

[51] Int. Cl.[4] .................................................. G06F 9/00

[52] U.S. Cl. .................................................. 364/900

[58] Field of Search ... 364/200 MS File , 900 MS File

[56] References Cited

PUBLICATIONS

Graphics Character Generator by Robin Moore, published in Microcomputing Aug. 1980, p. 106, et seg.

*Primary Examiner*—Thomas M. Heckler
*Assistant Examiner*—John G. Mills
*Attorney, Agent, or Firm*—C. Lamont Whitham

[57] ABSTRACT

A personal computer having an interactive all points addressable display thermal (44) and a cursor positioning device (52) is provided with apparatus for facilitating the generation of a graphics display. At least one table of selectable cursor characters is stored in memory (16), and from this table, any character can be selected to be the cursor character. The selected character is displayed as the cursor and movable to any point on the all points addressable display by the cursor positioning device. Once the current cursor character is at a desired point on the display, it is fixed in that position by reading the position and cursor data into the display buffer of the display terminal.

9 Claims, 11 Drawing Figures

SCHEMATIC BUILDING CURSOR CHARACTER

RELATED APPLICATIONS

This application is related to the following concurrently filed applications which are assigned to a common assignee and are incorporated herein by reference:

U.S. Pat. No. 4,555,772 issued to Lawrence K. Stephens and entitled "Current Cursor Symbol Demarkation".

Application Ser. No. 06/499,451, filed May 31, 1983, by Lawrence K. Stephens and entitled "Text Placement on Graphics Screen".

Application Ser. No. 06/499,453, filed May 31, 1983, by Lawrence K. Stephens and entitled "Moving Eraser for Graphics Screen", now abandoned.

FIELD OF THE INVENTION

The present invention generally relates to Computer Assisted Design (CAD) systems, and more particularly to an inexpensive and easy to use CAD application for personal computers.

BACKGROUND OF THE INVENTION

Computer Assisted Design (CAD) and Computer Assisted Manufacturing (CAM) systems have been used for some time in the aircraft and automotive industries to design and manufacture aerodynamic and mechanical components. Such systems typically comprise a main frame computer, large bulk memory systems including tape units, rigid disk units and removable disk pack units, high resolution All Points Addressable (APA) Cathode Ray Tube (CRT) displays, a large Random Access Memory (RAM) of sufficient capacity to store the graphics application and address each pixel of the high resolution displays, and Input/Output (I/O) devices such as digitizer pads with cursors and plotters. These systems are very expensive, but their cost can could be justified because of the large sums of money invested in the design and manufacture of an aircraft or a new automobile model. The price of CAD systems has come down significantly over the past decade due to economies of computer and memory system manufacture, and because of that, CAD systems are being applied to many new uses among which are architectual design and the layout of photoresist patterns for integrated circuits. Nevertheless, CAD systems are still quite expensive, and their use is generally limited to correspondingly expensive applications.

At the other end of the spectrum are the so-called personal computers based on the microprocessors which have been developed over the past decade. These typically comprise a mother board containing the microporcessor, a Read Only Memory (ROM) encoded with the Basic Input/Output system (BIOS) for controlling the microporcessor, a limited amount of RAM, and a number of adapters for interfacing with various I/O devices. These I/O devices may include a keyboard, a medium or high resolution CRT display, one or more floppy disk drives, and a printer such as one of the more popular dot matrix printers. Although personal computers are small and compact, they are capable of some fairly sophisticated applications. They are especially well suited to business applications such as accounting, data base management and business analysis. Recently, a number of business applications have been developed which include graphics support. These applications take the input or calculated numerical data and produce line graphs, bar charts and pie charts which are much easier to interpret than the raw numerical data. Prints of these graphical displays are made by reading out the data in the APA display RAM to a dot matrix printer provided with a graphical capability or to an inexpensive pen plotter. The latter device is also capable of generating transparencies for use in overhead projectors. The acceptance of business applications with graphics support has been immediate and substantial with the result that there is a considerable demand for graphics applications which are not necessarily limited to business graphs. The ability to generate schematic diagrams, flow charts, floor plans and similar graphic displays would be highly desirable in the production of technical manuals, advertising layouts and the like.

SUMMARY OF THE INVENTION

It is therefore an object of the invention to provide an inexpensive Computer Assisted Design (CAD) application for personal computers.

It is another object of the invention to provide a CAD system for personal computers which is easy to use and facilitates the generation of schematic diagrams, flow charts and other free form graphics displays.

It is a further object of the invention to provide a user friendly CAD application for personal computers which is operated by an inexpensive joy stick or similar device and supports a dot matrix printer or inexpensive plotter.

The objects of the invention are accomplished by making the cursor symbol a graphics character or an A/N string which may be moved about the display screen by means of a joystick or similar input device. Once the graphics character or A/N string is positioned at the desired location, the operator presses a command button, and the graphics symbole or A/N string is fixed in postion on the display screen by reading the symbol data into the display buffer at that position. The cursor symbol can be moved again to another location on the display and another character fixed in position on the display by pressing the command button. Different cursor symbols can be selected from symbol tables so that a variety of symbols can be used to generate the graphics display. The current cursor symbol is demarked from other graphics characters fixed in the display by continuously exclusive ORing the cursor symbol with the background graphics data. In addition, an erase function is provided to allow the correction of mistakes and modification of standard symbols.

BRIEF DESCRIPTION OF THE DRAWINGS

The foregoing and other objects, advantages and aspects of the invention will be better understood from the following detailed description of the invention making reference to the accompanying drawings, in which.

DESCRIPTION OF A PREFERRED EMBODIMENT

Figure 1:
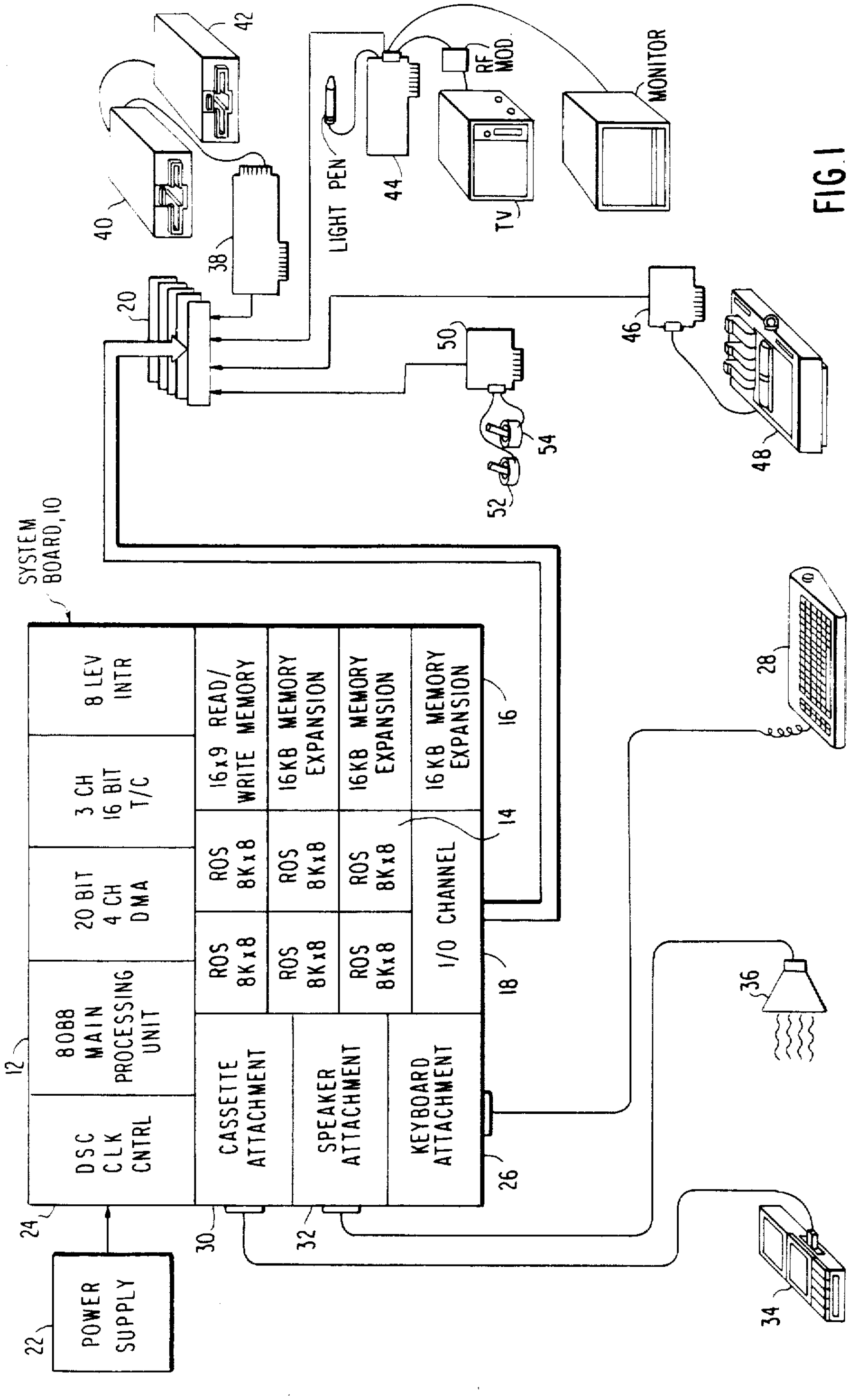
FIG. 1 is a system block diagram of a typical personal computer on which the application according to the invention is operated.

In order to better understand the invention, a typical personal computer will be first described with reference to FIG. 1 of the drawings. The system or mother board 10 includes the microporcessor 12, ROM 14, RAM 16, and an I/O channel 18 which includes a number of I/O expansion slots 20 for the attachment of various options. A power supply 22 provides power to the mother board 10 and the attached options. The mother board 10 in addition includes a crystal oscillator, clock and control circuits 24 and a keyboard attachment 26 to which a keyboard 28 is attached. In addition, the mother board may also include other attachments such as a cassette attachment 30 and a speaker attachment 32 to which are connected a cassette recorder 34 and a speaker 36, respectively. The expansion slots 20 are designed to receive any of the various adapter printed circuit cards shown in the figure. More specifically, a diskette drive adapter 38 may be plugged into one of the slots 20. This adaptor 38 is required to support one or more diskette drives 40 and 42. A color/graphics monitor adapter 44 may also be plugged into one of the slots 20, and this adapter supports either a home color TV or an RGB monitor and a light pen. A parallel printer adapter 46 may be plugged into another one of slots 20 to support, for example, a dot matrix printer 48. Finally, a game control adapter 50 can be plugged into a remaining one of the slots 20 to support one or more joy sticks 52 and 54. Other adapters may be plugged into the slots 20, but only those necessary to support the present invention are illustrated.

Figure 2:
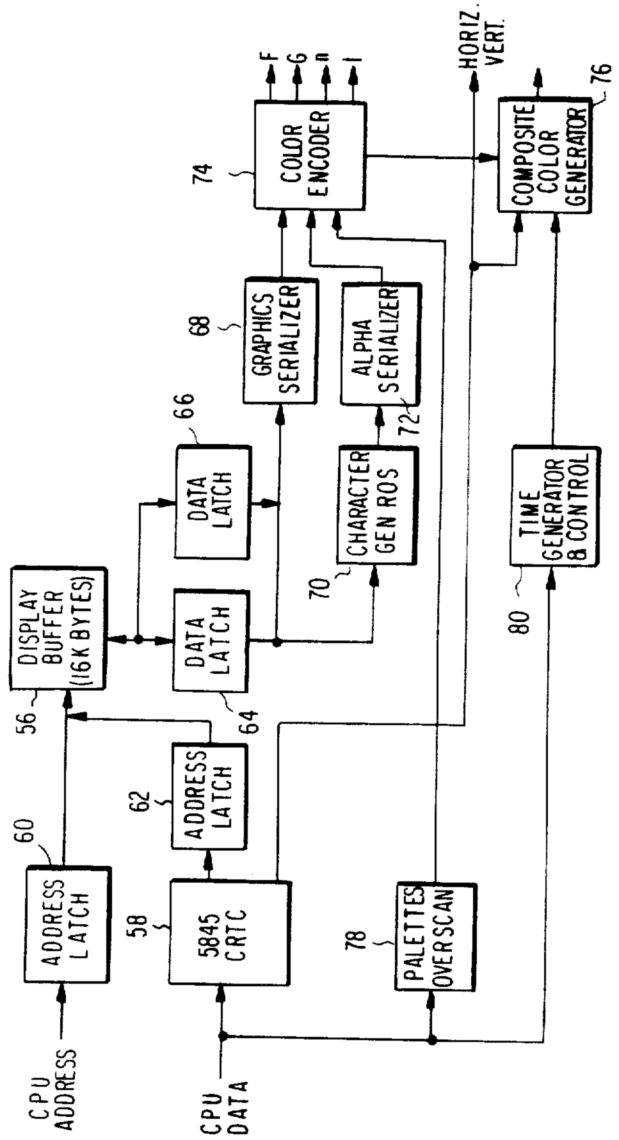
FIG. 2 is a block diagram of a color/graphics monitor adapter of the type which is required to support the application according to the invention.

The color/graphics adapter 44 has two basic modes of operation; alphanumeric (A/N) and APA. In both modes, A/N characters are defined in a character box and formed from a ROM character generator containing dot patterns for standard ASCII characters. FIG. 2 is a block diagram of the adapter 44 which contains a display buffer 56 and a CRT controller device 58 such as a Motorola 6845 IC. The controller device 58 provides the necessary interface to drive a raster scan CRT. The display buffer 56 can be addressed by both the CPU and the controller device 58 through address latches 60 and 62, respectively. Data is read out of the display buffer to data latches 64 and 66 which provide outputs to a graphics serializer 68 and a character generator comprising ROM 70 and an alpha serializer 72. The outputs of the serializers 68 and 72 are provided to the color encoder 74 which either drives an RGB monitor directly or provides an output to the composite color generator 76 that drives a home color TV. The color encoder 74 also receives the output of the pallette/overscan circuits 78 which provides intensity information. The composite color generator 76 receives horizontal and vertical sync signals from the CRT controller device 58 and timing control signals from the timing generator and control circuits 80. The timing generator and control circuits also generate the timing signals used by the CRT controller device 58 and the display buffer 56 and resolves the CPU and controller contentions for accessing the display buffer.

Figure 3:
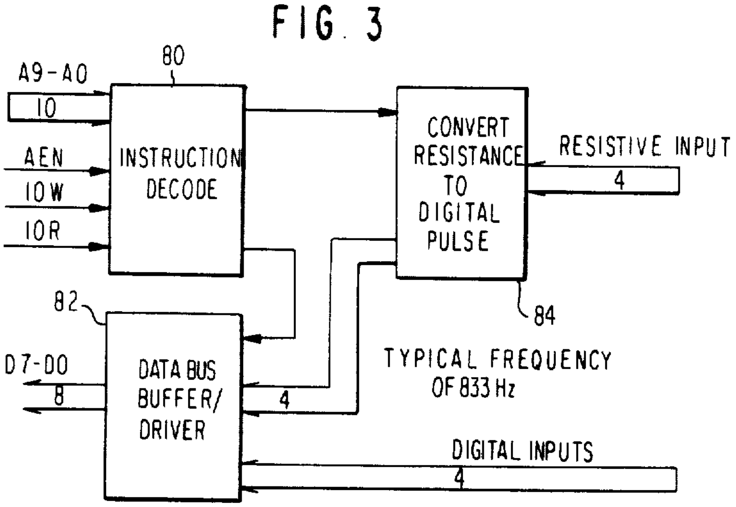
FIG. 3 is a block diagram of a game control adapter of the type which provides a joystick input to the personal computer shown in FIG. 1.

FIG. 3 is a block diagram of the game control adapter 50. The adapter comprises instruction decode circuits 80 which may be composed of 74LS138 IC's. The data bus is buffered by a 74LS244 buffer/driver 82. The digital inputs to this buffer/driver are provided by trigger buttons on the joy sticks. The joystick positions are indicated by a potentiometer for each coordinate which must be converted to digital pulses by resistance to pulse converter 84. This is accomplished by providing a one-shot for each potentiometer so that the potentiometer varies the time constant of its associated one-shot. A select output from decoder 80 causes the one shots to be fired to provide pulse outputs to the buffer/driver 82.

Although the invention is described as using a joy stick to position a cursor symbol on the display screen, it will be understood by those skilled in the art that other input devices can be used including cursor keys on a keyboard. The cursor keys are, however, inherently slow to operate, and so it is prefereable to use a joy stick or similar type input device. Besides a joy stick, a "mouse" might just as well be used. These devices have a ball on the bottom of a palm size controller, and the ball is rolled on a flat surface to control the cursor position. Typically, the ball actuates potentiometers in a manner quite similar to a joy stick. Thus, everywhere a joy stick is mentioned in the description of the invention, those skilled in the are will recognize that a "mouse" or other similar input device could be substituted.

According to the invention, the cursor on the CRT display is replaced by a graphics symbol or an A/N character string and moved by means of a joy stick or similar device. When the graphics symbol or A/N character string are positioned on the display at the desired position, the operator presses a trigger button on the joy stick and the graphics symbol or A/N character string remain fixed at that location by reading the symbol data into the display buffer. A new graphics character or A/N character string can then be selected from the cursor symbol and the process repeated so that a schematic diagram, flow chart or similar graphics display can be built. Previously positioned graphics characters or A/N character string can be erased totally or partially by means of a box cursor and the operation of the trigger button on the joy stick. This allows not only for the correction of errors but also the generation of modified characters giving more flexibility to the defined character tables. In addition, since the selected cursor symbol will remain the cursor symbol until changed even after a graphics character or A/N character string has been positioned on the display screen, the cursor symbol is at all times exclusive ORed with display data of all coincident pixels as it is moved about the display screen to provide a clear and visible demarkation of the cursor symbol from other symbols previously placed at various locations on the display screen. Thus, the invention allows a fully interactive positioning of graphics characters and/or A/N character strings at any addressable point on the display screen. Since the screen information is contained in the APA display buffer, the screen can be printed in the usual way to provide a hard copy output thereby facilitating the production of technical illustrations, manuals or the like.

Figure 4:
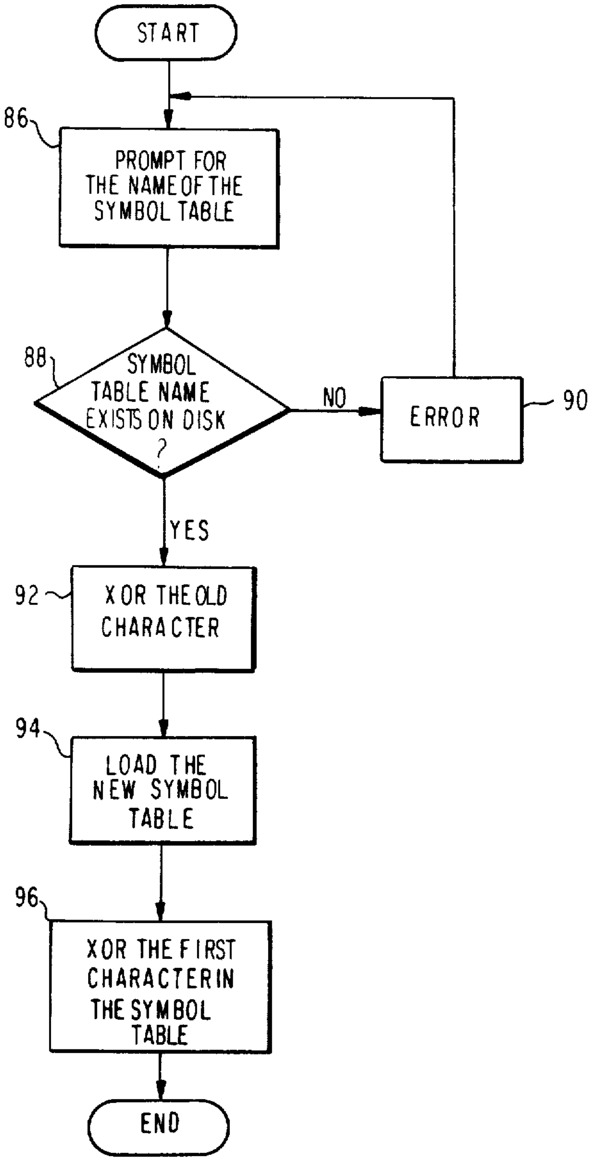
FIG. 4 is a flow diagram illustrating the procedure for loading a cursor symbol table.

The underlying feature of the invention is the use of a graphics character as the cursor symbol. Therefore, one and preferrably more symbol tables are provided. For example, a table could be provided for electrical symbols, another for architectual symbols, and another for industrial process symbols. Each symbol in each table is identified by number so that the code for a symbol includes both the table to which it belongs as well as its number within the table. In order to select a cursor symbol, a symbol table must first be loaded into RAM. This process is illustrated by the flow diagram shown in FIG. 4. When the operator requests a new symbol table, s/he is first prompted for the name of the symbol table as indicated by block 86. The name input by the operator is checked to determine if it is a valid name, that is it identifies a table that exists in the current library of tables. This is indicated by the decision block 88. If the name is not a valid name, an error message is displayed to the operator at block 90 and the operator is again prompted for the name of the symbol table desired. When a valid name is input by the operator, the old cursor symbol is exclusive ORed with itself to delete the symbol from the display screen as indicated by block 92. Then in block 94 the new symbol table is loaded into RAM, and in block 96, the first graphics character is exclusive ORed with the current cursor symbol to cause the first graphics character to be displayed as the cursor symbol. In other words, the first graphics character is the default cursor symbol.

Figure 5:
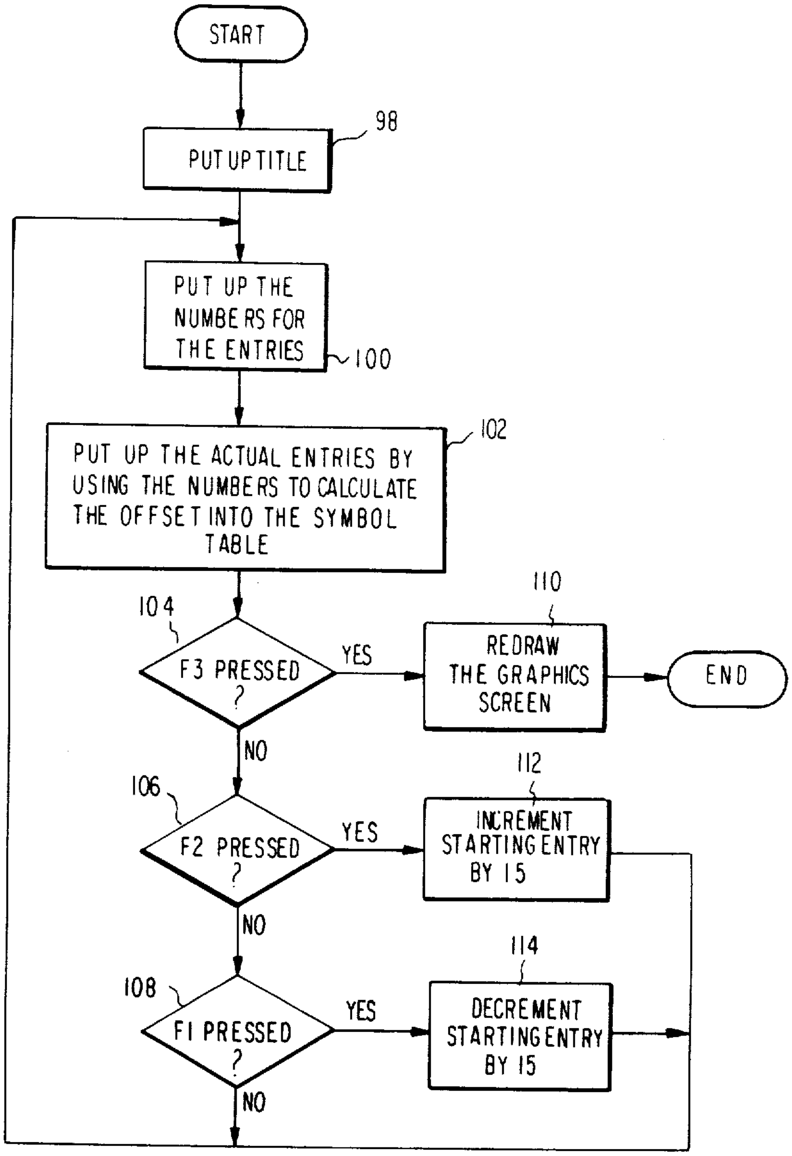
FIG. 5 is a flow diagram illustrating the procedure for displaying a loaded cursor symbol table.

The default cursor symbol may not be the symbol desired by the operator, so it may be desirable to display the selected symbol table to permit selection of the desired symbol. This process is illustrated by the flow diagram shown in FIG. 5. When the operator requests that the symbol table be displayed, the title of the currently selected symbol table is first displayed as indicated by block 98. The title will always be displayed during this process no matter how the field of the display may change. In other words, any given symbol table may be too large to fit on a single screen and it may be necessary to scroll the display in or der for the operator to view all the symbols in the table. While the field of the display may be scrolled, the title placed on the screen by block 98 will remain. Once the title of the table has been put up, the numbers for the various graphics characters are next put up as indicated by block 100, and then the actual graphics characters are put up adjacent their corresponding number as indicated by block 102. Three function keys identified as F3, F2 and F1 are monitored to detect if they have been pressed by the operator as indicated by the decision blocks 104, 106 and 108. If for example key F3 has been pressed, then the graphics screen is redrawn as indicated by block 110. When this is done, the operator is presented a display of the graphics screen as s/he had generated it to that point in time. If F2 is pressed, then the symbol table is scrolled down a predetermined amount as indicated by block 112, but if F1 is pressed, the symbol table is scrolled up a predetermined amount as indicated by block 114. In other words, the function keys F3, F2 and F1 give the operator control of the display screen after the symbol table is displayed. F3 allows the operator to exit the display, and F2 and F1 allow the operator to scroll the display.

Figure 6:
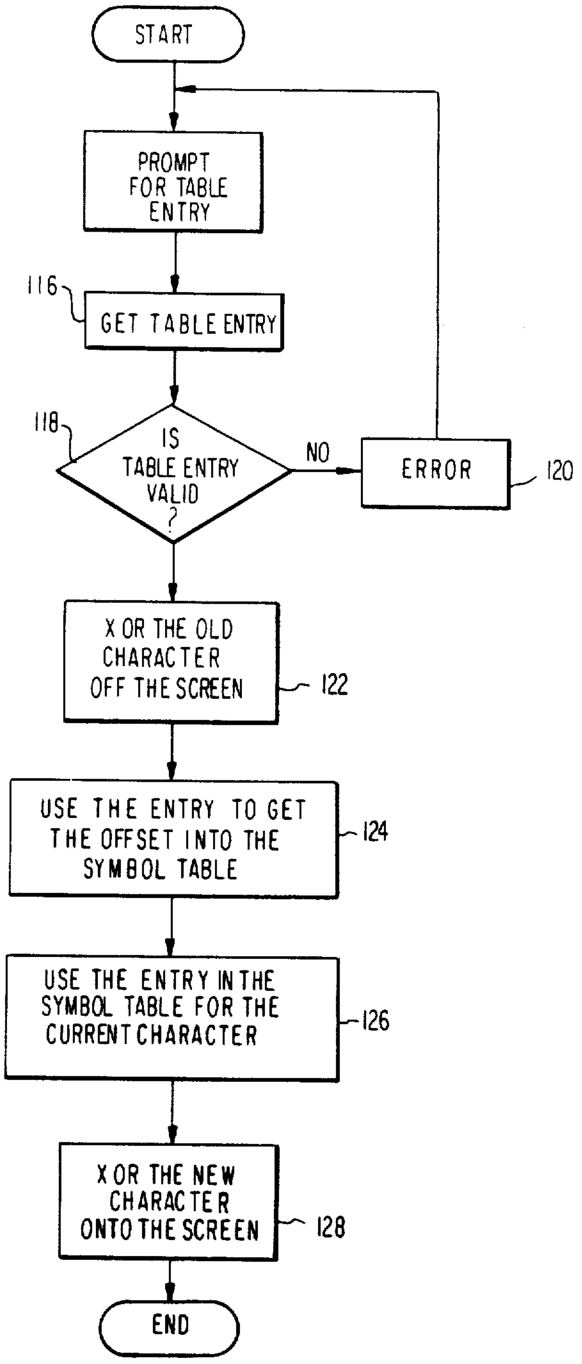
FIG. 6 is a flow diagram illustrating the procedure for selecting a new cursor symbol for a loaded symbol table.

It is not necessary to display the symbol table each time it is desired to change the cursor symbol. The operator may already know the numbers of the symbols s/he wants to use in generating a graphics display, or more likely, the operator will have printed copies of the symbol tables to refer to. In any event, once a symbol table has been loaded according to the process illustrated in FIG. 4 and the first symbol of the table is displayed as the default cursor symbol, the operator may wish to change the cursor symbol. This is accomplished with the selection of a new symbol according to the procedure illustrated in the flow diagram of FIG. 6. The operator selects a cursor symbol by number within the currently loaded table. The first thing that is done when a cursor symbol selection has been made is to retrieve the table entry as indicated in block 116 and then in block 118 validate the entry. It will be understood that the various cursor symbol tables will not necessarily be the same size and that a symbol number that is valid for one table may not be valid for another. Should the operator enter an invalid symbol number, an error message is displayed as indicated by block 120 and the operator is returned to the selection menu. Assuming that a valid symbol number is selected, the old cursor symbol is deleted from the screen by exclusive ORing the symbol with itself as indicated in block 122. Then using the table entry, the offset into the symbol table is determined in block 124. This provides the access to the desired symbol code for the character generator in block 126, and in block 128, the new cursor symbol is displayed by exclusive ORing the symbol with the background data on the screen.

Figure 7:
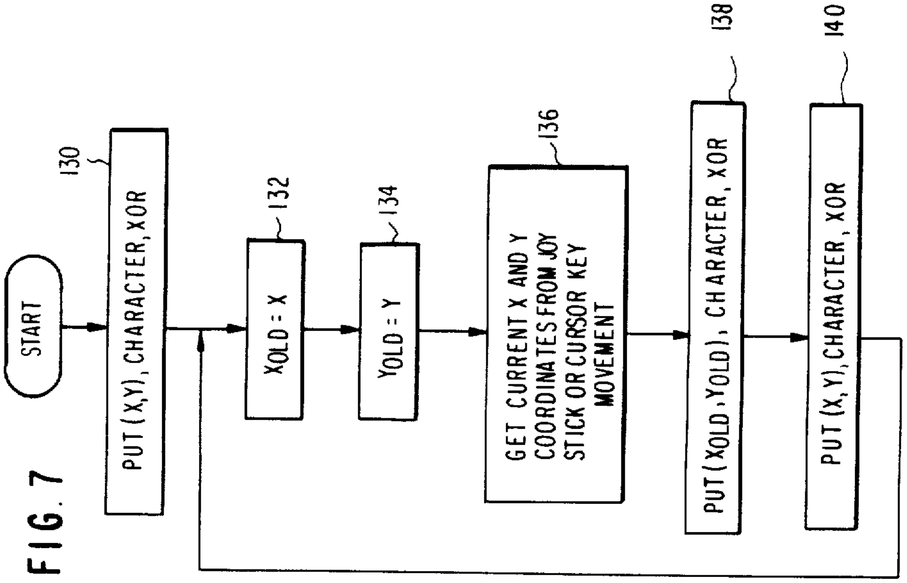
FIG. 7 is a flow diagram illustrating the procedure for demarking the current cursor symbol for other graphics symbols which may be displayed on the screen.

This latter process is the basis for demarking the current cursor symbol from other graphics symbols already placed in the graphics display. It will be appreciated that since the cursor of the subject invention is not a conventional cursor mark but rather a graphics symbol that is moved like a cursor to a desired position on the display screen and then fixed by command, there is the possibility that the operator might lose track of where and which of several currently displayed symbols is the cursor. This is accomplished in part by making the cursor symbol a flashing symbol as is conventional, but in addition, the current cursor symbol is exclusive ORed with the background display data to clearly demark the symbol where ever it may be on the screen from other graphics data already in place on the screen. This procedure is illustrated by the flow diagram shown in FIG. 7. In block 130, the current X,Y position as commanded by the joy stick control and the cursor symbol data are input and exclusive ORed. Then in blocks 132 and 134, the X and Y positions are temporarily stored as $X_{old}$ and $Y_{old}$. The current X and Y coordinates are obtained from the joy stick or cursor key input in block 136. Then in blocks 138 and 140 $X_{old}$, $Y_{old}$ and the cursor symbol data are exclusive ORed and current X,Y and the cursor symbol data are exclusive ORed. This removes the cursor symbol from the display screen and then redisplays it at its new location. The process is then repeated.

Figure 8:
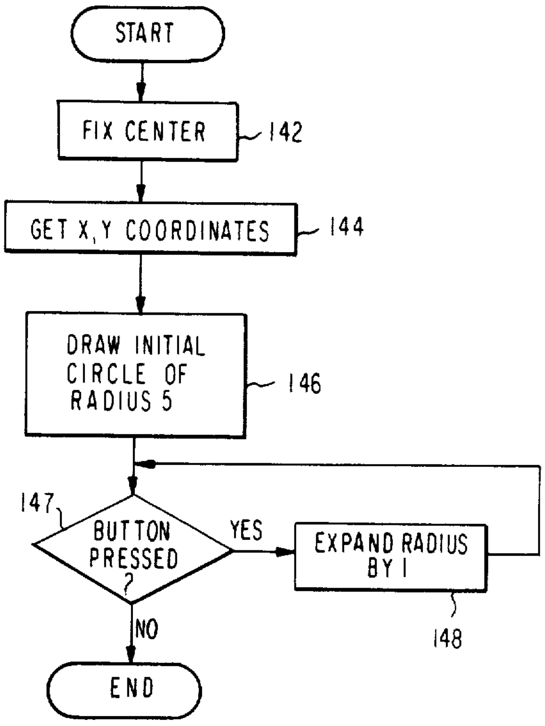
FIG. 8 is a flow diagram illustrating the procedure for generating a circle of any radius at any desired position on the display screen.

Besides the several symbol tables from which the operator can select a variety of cursor symbols, lines can be drawn between positioned symbols by indicating the coordinates of the end ponts of the line in the conventional manner. In addition, many graphics displays will make use of circles or arcs. Rather than provide a table of circles, a process for displaying a circle of any desired radius is provided. This process is illustrated in the flow diagram shown in FIG. 8. First the operator presses a function key F5 to indicate that s/he desires to draw a circle. This causes a conventional cursor symbol to appear on the screen and represents the center of the circle. The operator can then position this center on the screen using the joy stick. Then by pressing the trigger button on the joy stick, the circle center is fixed as indicated by block 142. Once this is done, the X,Y coordinates of the center are obtained in block 144, and in block 146, a circle of five units is drawn. This is the smallest diameter circle that is displayed. The trigger button is then monitored as indicated by the decision block 146, and if it is pressed, the circle is expanded by one unit in block 148. In this way the operator can increase the size of the circle, and when the desired size has been reached, the operator releases the trigger button.

Figure 9:
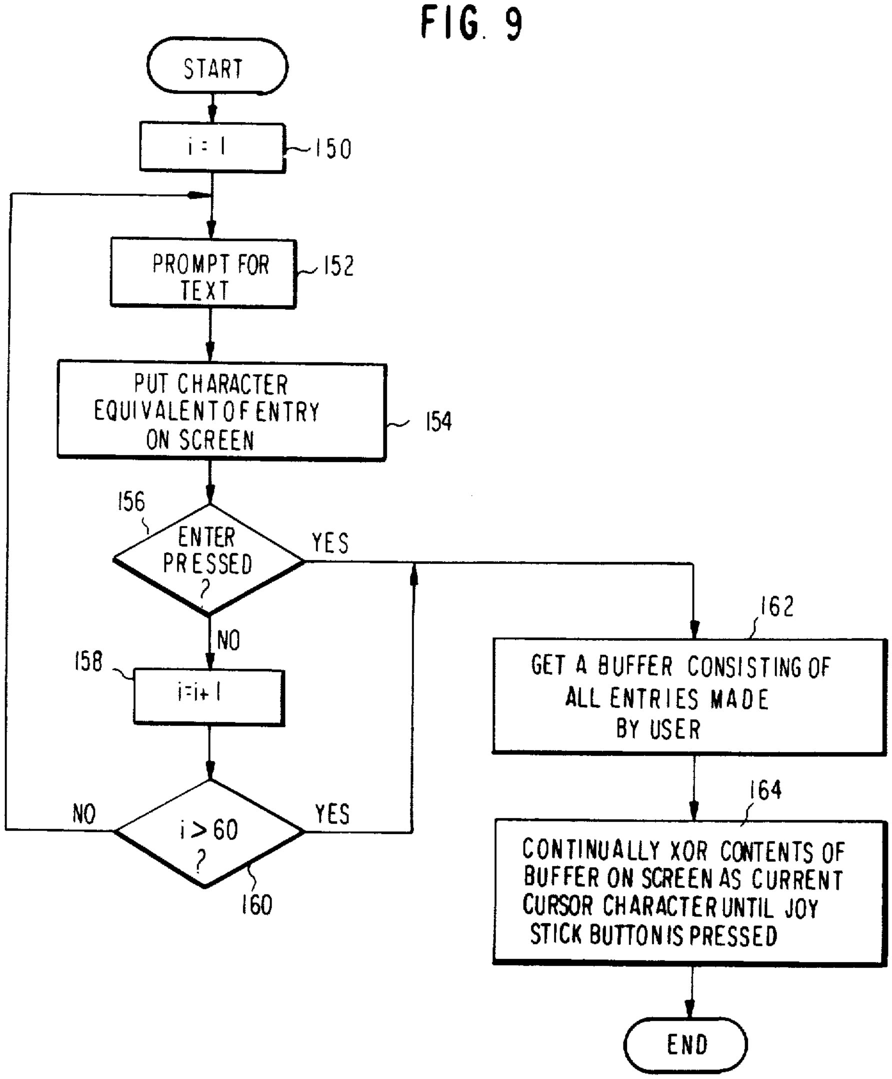
FIG. 9 is a flow diagram illustrating the procedure for entering and positioning A/N strings in the display.

As previously mentioned, the cursor symbol may be an A/N string as well as a graphics character. The operator enters the A/N mode by making the appropriate menu selection. The process is illustrated by the flow diagram shown in FIG. 9. The number of A/N characters entered are counted and so in block 150, the counter is set to 1. The operator is prompted in block 152 to input text from the keyboard, and as each character is keyed, the character equivalent of the operator's entry is put on the screen in block 154. Assuming that the "ENTER" key has not been pressed in decision block 156, the counter is incremented by one in block 158 and then checked in decision block 160 to determine if the maximum allowed number of characters has been entered. In the case illustrated, the maximum number of characters is sixty, but any number of characters can be arbitrarily set. The process continues until either the operator presses the "ENTER" key or the maximum number of characters has been entered at which time a buffer is loaded with all the A/N characters keyed by the operator as indicated by block 162. This buffer is treated as the cursor symbol data which can be positioned anywhere on the display screen by use of the joy stick. Thus, the A/N string is continually exclusive ORed on the screen as the current cursor until the trigger button is pressed by the operator as indicated by block 164. In other words, when the operator enters the text mode from the menu, s/he first keys in the desired text, presses "ENTER" and then moves the A/N string around the screen as the current cursor symbol. When the next string is in the desired position, the trigger button on the joystick is pressed and the A/N string is fixed in the display data field.

Figure 10:
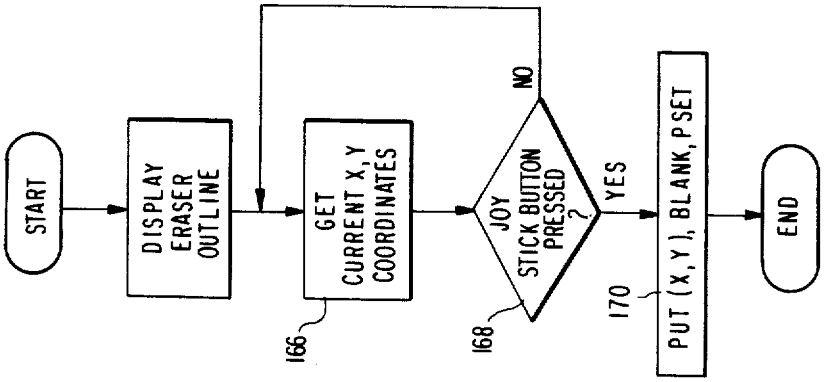
FIG. 10 is a flow diagram illustrating the procedure for erasing previously entered graphics data on the screen.

All good designers need an eraser to correct mistakes and modify standard symbols. The erase mode is entered by making the appropriate selection from a menu, and upon entry into this mode, the cursor symbol is changed to a rectangular box of predetermined dimensions. The process is illustrated by the flow diagram shown in FIG. 10. After the menu selection, the current X,Y position of the "eraser" rectangle is obtained as indicated in block 166. In decision block 168, the trigger button on the joy stick is monitored to determine if it has been pressed. If it has not been pressed, the position of the "eraser" rectangle is checked again and so on while the operator moves the "eraser" rectangle around the display screen. When the "eraser" rectangle is positioned over that area of the display screen which is desired to be erased, the operator presses the trigger button which causes all the display data within the "eraser" rectangle to be set to "zeros" to blank that area of the display screen as indicated by block 170. It is also possible to mover the "eraser" rectangle with the joy stick while pressing the trigger button which will result in all display data within the path of the "eraser" rectangle to be reset to "zeros". The procedure allows graphics data to be removed from the display screen easily and accurately.

Figure 11:
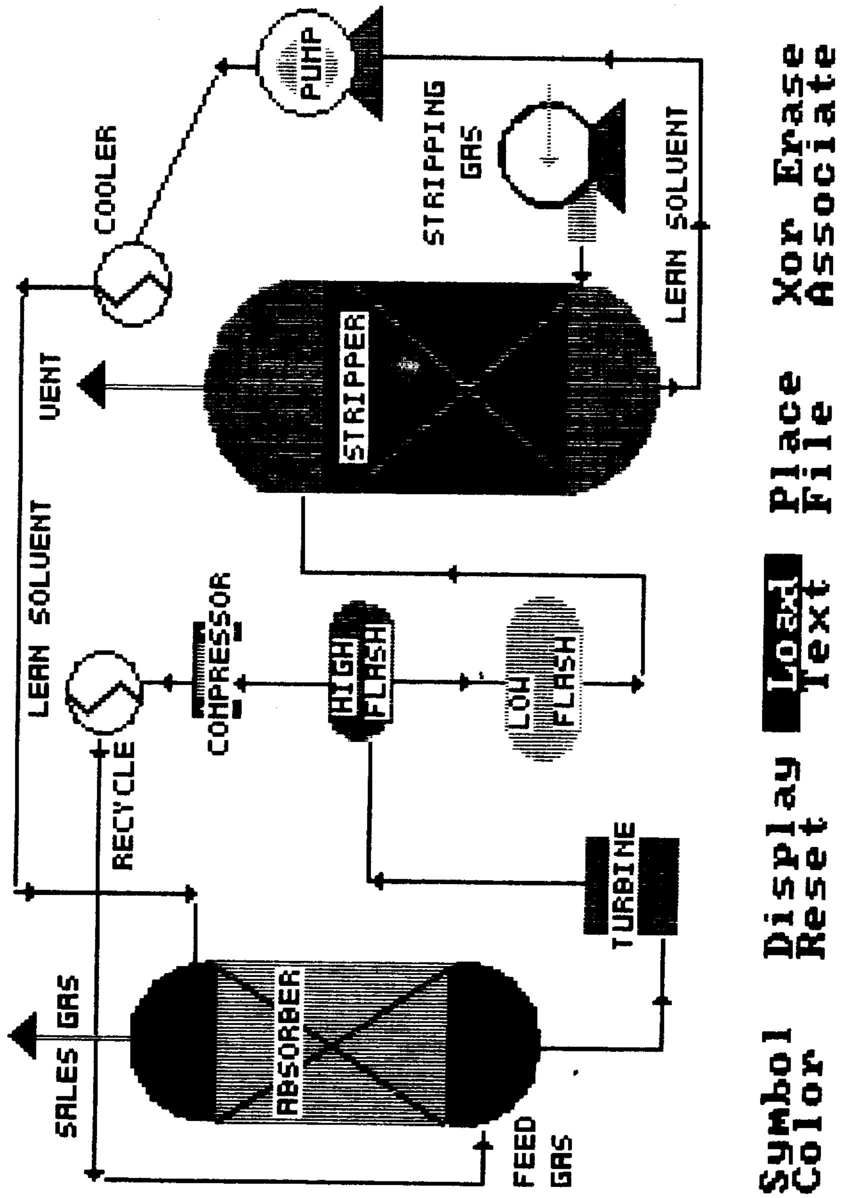
FIG. 11 illustrates a sample display generated using the application according to the invention.

FIG. 11 is an illustration of a graphics display constructed using the invention. Only a few graphics symbols were used plus circles, lines and A/N strings. Each symbol was selected from a table of symbols and then positioned at a desired place on the display screen using the joy stick and trigger button. At the bottom of the display is a menu from which the operator may make selections of operating modes.

Attached hereto as an appendix is the code listing of the application according to the invention. This code listing was prepared using the IBM Personal Computer BASIC Compiler. From the foregoing, it will be appreciated that the invention provides an inexpensive CAD application for personal computers which is easy to use and facilitates the generation of many graphics displays that heretofore could be generated using only much more expensive equipment.

APPENDIX

```
on error goto 31300
'
defint a-z
gosub 30000  ' turn off all function keys
key off
chrh = 36
chrw = 48
deadband = 20
xmax = 319
ymax = 199
x = 160
y = 100
notilefl = 0
numbsymb = 128
speed = 1
stateflag = 1
dim boxsel(904)
'
```

```
boxoff = 456
bigboxoff = 496
smalloff = 980
blueoff = 1554
greenoff = 1594
redoff   = 1634
whiteoff = 1674
symbtoff = 1714
'
oldoff = 20
ochrh = chrh
ochrw = chrw
startnbr = 0
osoff = 20
selflag = 0
button = 0
entryflg = 0
'
dim entry(30)
dim ulxchar(30)
dim ulychar(30)
dim alarm(30)
dim ulxvalue(30)
dim ulyvalue(30)
ddtrecno = 0
initflag = 0
colorflg = 0
pfflag = 0 'clear pfkey pushed flag
joyx = 0
joyy = 0
'
'
'     To enable the user to change colors quickly,
'     it became necessary to read in some data points
'     These represent bit masks for identifying
'     colors.
'     Here is where they are read from a data statement.
'
dim newcolor(15)
'
dim chcolor(31)
'
dim coloro(3)
'
'     newcolor = the array of new color masks
for i = 0 to 15
     read newcolor(i)
next i
'
'     chcolor = the array of original masks to be recognized
'               and changed.
'
for i = 0 to 31
     read chcolor(i)
next i
'
'     coloro = offset values for the individual colors
'              into the 2 mask arrays.
'
for i = 0 to 3
     coloro(i) = i * 8
next i
'
'
'
'  offset2 is the offset past the offsets and number of
'  symbols into the actual symbols in the symbol table.
'  initially it is set to reflect the default symbol table
'
offset2 = 258
'
'     get segment register from dos offset
'
```

```
def seg = 0
storage = peek(&h3fe) + 256 * peek(&h3ff)
def seg = storage
'
' initial cursor will be the duck
'
bload "worksym.sym",20
'
'     set up color blocks
'
for i = 0 to 3
'
     off1 = i * 40
     poke blueoff + off1, 20
     poke blueoff + off1 + 1, 0
     poke blueoff + off1 + 2, 12
     poke blueoff + off1 + 3, 0
'
     if i = 0 then ij = 0
     if i = 1 then ij = 85
     if i = 2 then ij = 170
     if i = 3 then ij = 255
     for j = 4 to 39
         poke blueoff + j + off1, ij
     next j
'
next i
'
'  initial symbol table will be defaulted
'
     bload "DEFAULT.SYM",symbtoff
'
     def seg
'
'    get the joystick settings
'
     gosub 22000
    'gosub 15000      ' switch to the graphics tube
'
     gosub 502 ' display prompts
'
     soff = 20
     call gxor( x, y, storage, soff)
'
'
'    Turn on the joystick button
'
strig(0) on
on strig(0) gosub 70
'
'    Set up the joystick qualifiers
'
     nxvar = xvar - deadband
     xvar = xvar + deadband
     xvar1 = xvar + 20
     nxvar1 = nxvar - 20
     xvar2 = xvar1 + 40
     nxvar2 = nxvar1 - 40
'
     nyvar = yvar - deadband
     yvar = yvar + deadband
     yvar1 = yvar + 20
     nyvar1 = nyvar - 20
     yvar2 = yvar1 + 40
     nyvar2 = nyvar1 - 40
'
     def seg = storage
'
'    If monochrome is attached put up the help screen
'
     if peek(14) = 1 then gosub 31400
'
```

```
switch = 1
while switch
'
     xold = x
     yold = y
     osoff = soff
     if key2 = 71 then x = x - speed: y = y - speed
     if key2 = 72 then y = y - speed
     if key2 = 73 then x = x + speed: y = y - speed
     if key2 = 75 then x = x - speed
     if key2 = 77 then x = x + speed
     if key2 = 79 then x = x - speed: y = y + speed
     if key2 = 80 then y = y + speed
     if key2 = 81 then x = x + speed: y = y + speed
     key2 = 0
     if joystick <> 0 then gosub 5
'
'    Check cursor positioning
'
     gosub 2
'
'
'    Continually xor the cursor onto the screen.
'
     if stateflag = 7 then gosub 41 else gosub 10
'
'    Handle below the display line functions
'
     if colorflg = 0 then if y + chrh > 172 then entryflg = 1: gosub 3
     if colorflg = 0 then if entryflg <> 0 then if y + chrh < 172 then initflag
 0: stateflag = 1: gosub 1[illegible]0: gosub 9: gosub 502
'
'    get key input from the user.
'
     if button = 1 then gosub 1000 ' switch checker
     button = 0
'
     k$ = inkey$
     if k$ <> "" then if len(k$) < 2 then gosub 55 else gosub 60
'
'
wend
'
end
'
1 '
'
'    Display prompt lines
'
     locate 24,1
     print "Symbol  Display  Load  Place  Xor Erase";
     locate 25,1
     print "Color   Reset    Text  File   Associate";
'
     return
'
2 '
'
'    Check x and y positioning and adjust accordingly
'
     if x + chrw > xmax then x = xmax - chrw else if x < 0 then x = 0
     if y + chrh > ymax then y = ymax - chrh else if y < 0 then y = 0
'
     return
'
3 '
'
'    Handle positioning of the cursor
'    And branch accordingly.
'
'    reset state flag to reflect the proper state
'    Default = Place (1)
'
```

```
     if stateflag = 2 then: stateflag = 1: gosub 14800: gosub 502: return
'
'    Change cursor, set state for selection, and prompt user.
'
     if selflag = 0 then gosub 4: stateflag = 0: gosub 502: call gxor(x, y, stor
age, soff): selflag = 1
'
'
'    Note: no changing of the true character to anything else
'          should go above here.
'
     xch = x + 1
     ych = y + 1
'
     if ych < 192 then gosub 31000 else if ych > 191 then gosub 31100
'
     gosub 8
     button = 0
'
     return
4 '
'
'    Change to the degrees
     quadnew = 0
     quadold = 0
     call gxor(x, y, storage, soff)
     befselx = x
     befsely = y
     oldoff = soff
     soff = smalloff   ' initially a degrees sign
     ochrh = chrh
     ochrw = chrw
     chrh = 3
     chrw = 3
     y = 187
'
     return
'
5 '
'
'    Joystick subroutine
'
          x2 = stick(0)
          y2 = stick(1)
'
          if x2 > xvar then joyx = joyx + 1 else if x2 < nxvar then joyx = joyx
- 1
          if y2 > yvar then joyy = joyy + 1 else if y2 < nyvar then joyy = joyy
- 1
'
          if joyx > 6 then x = x + speed: joyx = 0
          if joyy > 6 then y = y + speed: joyy = 0
          if joyx < -6 then x = x - speed: joyx = 0
          if joyy < -6 then y = y - speed: joyy = 0
'
          if x2 > xvar1 then x = x + SPEED else if x2 < nxvar1 then x = x - SPE
D
          if y2 > yvar1 then y = y + SPEED else if y2 < nyvar1 then y = y - SPE
D
'
          if x2 > xvar2 then x = x + SPEED * 3 else if x2 < nxvar2 then x = x -
SPEED * 3
          if y2 > yvar2 then y = y + SPEED * 3 else if y2 < nyvar2 then y = y -
SPEED * 3
'
     return
'
8 '
'
'    If first row of choices is selected then distinguish the
'    function.
'
```

```
'     locate 2,1
'     print "HS:  x = y = ";x;y;
'
      if quadnew = 1 and button = 1 then gosub 230:  return ' Select new cursor
haracter
      if quadnew = 2 and button = 1 then gosub 250: return  ' diplay symbol tabl
      if quadnew = 3 and button = 1 then gosub 240: return' load new symbol tabl
      if quadnew = 4 and button = 1 then stateflag = 1: gosub 400: return  ' pla
e mode
      if quadnew = 5 and button = 1 then stateflag = 3: gosub 400: return  ' xor
mode
      if quadnew = 6 and button = 1 then stateflag = 2: gosub 400: return ' Eras
 mode
'     If second row of choices is selected then determine the
'     function.
'
'
'     locate 3,1
'     print "HS:  x = y = ";x;y;
'
      if quadnew = 7 and button = 1 then stateflag = 10 : message$ = "Point to c
lor to change and press RED"
      if quadnew = 7 and button = 1 then gosub 800: return  ' change color
      if quadnew = 8 and button = 1 then gosub 700: return  ' reset
      if quadnew = 9 and button = 1 then gosub 950: return ' text
      if quadnew = 10 and button = 1 then gosub 1800: return ' file
      if quadnew = 11 and button = 1 then stateflag = 4: gosub 400  ' associate
'
      return
'
9 '
'
'     Clear extra graphics area
'
      yput = 178
      xput = 310
      call gpset(xput, yput, storage, blueoff)
      yput = 188
      call gpset(xput, yput, storage, blueoff)
'
      return
'
10 '
'
'     xor the screen  with the cursor character.
'
      call gxor( xold, yold, storage, osoff)
      call gxor( x, y, storage, soff)
      pfflag = 0
'
      return
'
20 '
'
'     pset the current cursor character
'
      call gpset (x, y, storage, soff)
      call gxor (x, y, storage, soff)
      pfflag = 0
'
      return
30 '
'
'     erase the current cursor area
'
      locate 24,1
      call gpset(x, y, storage, blueoff)
      call gxor(x, y, storage, soff)
      pfflag = 0
'
      return
'
```

```
40 '
'
'         xor the symbol
'
    call gxor(x, y, storage, soff)

    for i = 0 to 1000: j    : next i
   'pfflag = 0
'
    return
'
41 '
'
'   text handler
'
    put (xold,yold), boxsel, xor
    put (x, y), boxsel, xor
'
    return
'
42 '
'
'   text putter
'
    put (xold, yold), boxsel, pset
    put (xold, yold), boxsel, xor
'
    return
'
55 '
'
'   Handle the few normal keys we handle
'
    if k$ = "" then return
    key2 = asc(k$)
    if key2 = 43 then pfflag = 1: button = 1 else beep
    for q = 0 to 100: d = 0:next
    return
'
60 '
'
'  handle extended keys
'
    if pfflag = 1 then return
    k$ = right$(k$,1)
    key2 = asc(k$)
    if key2 > 58 and key2 < 69 then key2 = key2 - 58 else return
    pfflag = 1
    on key2 gosub  100, 200,  300, 233,  1900  , 2000,  1700,  800,  1100,
55
'
'               +    -   end symbol CIRCLE  box   screen color line
'            cursor speed
'
    return
'
70 '
'
'   Joystick has been pushed
'
    button = 1
    pfflag = 1
    for q = 0 to 100: d = 0:next
    return
'
100 '
'
'   F1 will speed up the cursor each time it is pressed.
'
    speed = speed + 1
    pfflag = 0 'clear pfkey pushed flag
    return
```

```
200 '
'
'     F2 will slow down the cursor each time it is pressed.
'
      speed = speed - 1
      if speed < 1 then speed = 1
      pfflag = 0 'clear pfkey pushed flag
'
      return
'
230 '
'
'     Prompt for entry number
'
      gosub 14800
'
233 '
'
'     This will allow entry from Pf key 2
'
      switch1 = 1
      while switch1
           numdisp$ = str$(numbsymb - 1)
           a = 4 - len(numdisp$)
           numdisp$ = string$(a, " ") + numdisp$
           message$ = "Enter table entry 0 -" + numdisp$  + " [    ]"
           inputcol = 28
           gosub 29010
           input;"", num$
           if val(num$) > numbsymb - 1 or val(num$) < 0 then gosub 231 else gosub
 232
      wend
'
'     Clean-up and return
'
      stateflag = 1
      gosub 502
      return
'
231 '
'
'     bad entry of symbol number
'
      numdisp$ = num$
      a = 4 - len(numdisp$)
      numdisp$ = string$(a, " ") + numdisp$
      message$ = "Entry:" + numdisp$ + "  was invalid.  Retry? Y/N-[ ]"
      inputcol = 38
      gosub 29010
      input;"",y$
      if y$ <> "Y" and y$ <> "y" then switch1 = 0
      return
'
232'
'
'     Good symbol number entered, so  get the symbol number.
'
      call gxor( x, y, storage ,soff)     ' clean up the old cursor
      symnum =  val(num$)
      gosub 14000     ' get the new symbol
'
'     reset the cursor
'
      gosub 2
      call gxor( x, y, storage, soff)
'    'Re-initialize the old offsets to reflect the new character.
'
      ochrw = chrw
      ochrh = chrh
'
      oldoff = soff
'
      switch1 = 0
      return
'
```

```
240 '
'
' This will be the driver for the change symbol table code
'
gosub 14800 ' cleanup the arrow
'
switch1 = 1   ' initialize the loop
'
while switch1
     nofilefl = 0
     message$ = "Symbol table? [           ]"
     inputcol = 16
     gosub 29010   ' set up for prompt input
     input;"",symbolt$
     if len(symbolt$) > 10 then gosub 241 else gosub 242
wend
'
'    Clean-up and head home
'
stateflag = 1
gosub 502
return
'
241  '
'
'    This code re-prompts if table name too long.
'
     nofilefl = 1
     message$ = "Name too long, try again? Y/N [ ]"
     inputcol = 32
     gosub 29010 ' prompt
     input;"",y$
     if y$ <> "Y" and y$ <> "y" then switch1 = 0
     return
'
'  This subroutine will check for existence of the table.
'
'
242 '
     on error goto 243
     file$ = symbolt$ + ".SYM"
     open file$ for input as #3
     on error goto 31300
     if (switch1 = 1) and (nofilefl = 0) then gosub 244
     return
'
243  '
'
'   This code handles disk errors for symbol table
'
     nofilefl = 1
     message$ = "Table not found, try again? Y/N [ ]"
     inputcol = 34
     gosub 29010 ' handle prompt
     input;"",y$
     if y$ <> "Y" and y$ <> "y" then switch1 = 0
     resume next
'
244  '
'
'    This code loads the symbol table
'
     close #3
'
'    Clean up the old cursor and load the first item initially
'
     call gxor( x, y, storage, soff)
     def seg = storage
     bload file$,symbtoff
     switch1 = 0
'
'    numbsymb = number of entries in the symbol table
```

```
'
      numbsymb = peek(symbtoff) + 256 * peek(symbtoff + 1)
      def seg
'
'     offset2 must be re-calculated
'
      offset2 = numbsymb * 2 + 2
'
      symnum = 0
      gosub 14000 'get new character
'
'     Check the positioning and put up the new symbol
'
      gosub 2
      stateflag = 1
      gosub 502
'
      call gxor( x, y, storage, soff)
'
      return
'
250 '
'
'     Display symbol table function
'
'
'     Clean-up the pesky arrow
'
      gosub 14800
'
'     Push the offset
'
      toff = soff
      ochrh = chrh
      ochrw = chrw
'
'     save screen away
'
      def seg = &hb800
      bsave "screen.scr",0,&h4000
      def seg
      startnbr = 0
      gosub 255
'
      switch1 = 1
      while switch1
251        k$ = inkey$
           if k$ <> "" then k$ = right$(k$,1) else 251
           key2 = asc(k$)
           if key2 > 58 and key2 < 62 then gosub 252
      wend
'
'     re-display screen, cleanup pointers and return
'
      cls
      def seg = &hb800
      bload "screen.scr",0
      def seg
'
'     Pop stack to get the good offsets
'     re-initialize the prompt and switches
'
      soff = toff
      oldoff = soff
      chrh = ochrh
      chrw = ochrw
'
      stateflag = 1
      gosub 502
'
      return
'
252 '
'
'     If key2 = 59 then previous, 60 = next, 61 = quit
```

```
'
     if key2 = 61 then switch1 = 0: return
     locate 24,1
     if key2 = 60 then startnbr = startnbr + 15
     if key2 = 59 then startnbr = startnbr - 15
     if startnbr > numbsymb - 1 then startnbr = numbsymb - 1: print "Press F3 t
 quit";: return
     if startnbr < 0 then startnbr = 0
     key2 = 0
     gosub 255
     return
'
255 '
'
'    Display 14 members of a symbol table
'
'
     if startnbr < 0 then return
'
     cls
'
     locate 1,12
     print "Symbol Table Display";
     endnbr = startnbr + 14
     if endnbr > numbsymb - 1 then endnbr = numbsymb - 1
     hor = 1
     ver = 5
     for symnum = startnbr to endnbr
'
          gosub 14000 ' get symbol
'
          if symnum < 100 then locate ver, hor + 3 else locate ver, hor + 2
          print symnum;
          dispx = 8 * hor + 32 - chrw/2  - 1
          dispy = 8 * ver + 24 - chrh/2  - 1
          call gxor (dispx, dispy, storage, soff)
          hor = hor + 8
          if hor > 33 then hor = 1: ver = ver + 7

     next symnum
return
'
300 '
'
'  This will be the end function.
'
     gosub 32000
     return
'
400 '
'
'    draw/erase
'
     call gxor (x, y, storage, soff)
'
'    Set up for the box for erasure or old character if draw
'
     if stateflag = 4 then soff = bigboxoff: chrh = 40: chrw = 48: colo flg = 1
     if stateflag = 2 then soff = boxoff: chrh = 12: chrw = 10
     if stateflag = 1 or stateflag = 3 then soff = oldoff: chrh = ochrh: chrw =
ochrw
'
     x = 160 - chrw / 2
     y = 88 - chrh / 2
'
     call gxor (x, y, storage, soff)      ' reset the cursor
     gosub 9                              ' clear the extra graphics w/o LF
'
     gosub 502       ' Prompt user with state
'
     return
'
502 '
```

```
'
'    Prompt user with current state.
'
     locate 23,1
'
     print string$(39," ");
'
     locate 23,1
'
     if stateflag = 1 then print "Position symbol and press RED to place";
'
     if stateflag = 2 then print "Position the box and press RED to erase";
'
     if stateflag = 3 then print "Position symbol and press RED to Xor";
'
     if stateflag = 4 then print "Enclose associated area and press RED";
'
     if stateflag = 6 then print "Center the value area and press RED";
'
     if stateflag = 7 then print "Position the text and press RED";
'
     if stateflag = 13 then print "Point to center of the circle & RED";
'
     if stateflag = 14 then print "Red = expand, F9 = chg col, F10 = Ha[illegible]";
'
     if stateflag = 16 then print "Point to the first corner then RED";
'
     if stateflag = 17 then print "Point to the opposite corner then RED";
'
     if stateflag = 20 then print "Point to the start and press RED";
'
     if stateflag = 21 then print "Point to the end and press RED";

     gosub 1          ' display prompts
     entryflg = 0
     selflag = 0
     initflag = 0
     pfflag = 0 'clear pfkey pushed flag
     return
'
700 '
'
'    reset the screen
'
     cls
     call gxor(x, y, storage, soff)
'
'    set default to be place
'
     stateflag = 1
'
'    Reset the associate DDT file.
'
     ddtrecno = 0
'
     gosub 14800
     gosub 502
'
     return
'
800 '
'
'    This will be the change cursor character color routine
'    Prompt for color to be changed
'
     gosub 14800
'
'    PFKEY ENTRY NEEDS FLAGS INITIALIZED.
'
810 '
'
'    Some entries into color donot need the cursor cleaned up .
```

```
'
    if stateflag < 10 then stateflag = 10: message$ = "Point to color to chanç
 and press RED"
'
    colorflg = 1
    gosub 29000 ' clean up prompt area
    xput = 0
    yput = 185
    for i = 0 to 3
        xput = i * 80 + 20
        if i = 0 then call gpset(xput, yput, storage, blueoff)
        if i = 1 then call gpset(xput, yput, storage, greenoff)
        if i = 2 then call gpset(xput, yput, storage, redoff)
        if i = 3 then call gpset(xput, yput, storage, whiteoff)
        call gxor(xput, yput, storage, boxoff)
    next i
'
    locate 23,1
    print message$
'
    x = 1
    y = 188
    chrh = 5
    chrw = 5
    soff = smalloff
    call gxor(x, y, storage, soff)
'
    return
'
801 '
'
'   get first color
'
    original = int(abs(x - 1) / 80)
    stateflag = 11
    locate 23,1
    print "Point to change to color and press RED";
'
    return
'
802 '
'
'   get second color
'
    newcol = int(abs(x - 1) / 80)
    gosub 14800
    call gxor(x, y, storage, soff)
    gosub 803
'
'   set draw to be the default mode
'
    stateflag = 1
    gosub 502   ' check for draw, erase
    colorflg = 0
    return
'
803 '
'
'   Change color
'
    origo = coloro(original)
    newo = coloro(newcol) / 2   ' offset into the new color mask table.
'
'   Clean-up the old cursor
'
    call gxor(x, y, storage,soff)
'
    gosub 804 'change the bits in storage
'
'   Put up new cursor
'
    call gxor(x, y, storage, soff)
'
    return
```

```
'
804 '.
'
'    Change color in storage and set switch1 = 1 to end
'    the main loop.
'
     def seg = storage    ' point to symbol table area
'
     xvalch! = peek(soff) + 256 * peek(soff+1)
     yvalch! = peek(soff+2) + 256 * peek(soff+3)
     xvalch! = xvalch! / 2
'
'    Get the number of bytes of date in the cursor
'
     bytes =  int(( xvalch! * 2.0  + 7.0 ) / 8.0 ) * yvalch!
'
'    add 4 to bytes to look past the x and y sizes
'    3 bytes to loops because of 0th element
     init = soff + 4
     loops = bytes + soff + 3
'
for j = init to loops
'
'          a is my stepper through the masks
'
           a = origo        ' initialize stepper to first offset in mask
           cvalue = peek(j)
'
'          Step through the 4 bit pairs / byte
'
           for i = 0 to 3
'
                one = chcolor(a)        ' mask to identify change character
                two = chcolor(a + 1)    'test mask
                three = 255 - one       ' cleanup mask for inserting character
                four = newcolor( newo + i)
'
'    I have half a mind not to document this, but......
'    Compare the 2 bit value to the highest value it could have.
'    If it equals the test mask then it is the correct color.
'    Then Clean out the found bit values and or in the new
'    mask.
'
                if (cvalue and one) = two then cvalue = cvalue and three or four
'
                a = a + 2          ' increment the stepper to the next two bit pair
'
           next i
'
           poke j,cvalue          ' replace the updated value
'
     next j
'
     def seg
'
'    End main loop by setting good switch
'
     switch1 = 0
     return
'
900 '
'
'    Associate a symbol with a process variable.
'
'
'    First clean-up the box!!!!
'
     call gxor(x, y, storage, soff)
     if ddtrecno > 30 then locate 25,1: print "Variable file full";: return
     switch1 = 1
     while switch1
          message$ = "Name of the variable:  [          ]"
          inputcol = 25
```

```
        gosub 29010
        input; "",var$
        a = len (var$): var$ = var$ + string$(8 - a, " ")
        gosub 901
        if nofilefl = 1 then gosub 903 else gosub 904
'
    wend
'
'   I variable name was found then get pointing for value
'   else return.
   if nofilefl = 0 then chrh = ochrh: chrw = ochrw: soff = oldoff: x = 160 -
hrh / 2: y = 88 - chrh / 2: call gxor(x, y, storage, soff):  stateflag = 1: gos
b 502: colorflg = 0
    if nofilefl = 1 then soff = smalloff: call gxor(x, y, storage, soff): gosu
 502
    if nofilefl = 1 then chrh = 5: chrw = 5
    return '
'
901 '
'
'   Check for existence of variable name
'
    nofilefl = 0
    on error goto 930
    open "varfile.tab" as #2 len = 64
    on error goto 31300
'
'   If no file then return
'
    if nofilefl <> 0 then return
    field #2, 2 as typeup$, 8 as varup$, 2 as f$, 2 as entry$, 50 as fill$
    get #2, 1
    num = cvi(typeup$)
    for i = 2 to num + 1
         get #2, i
         if var$ = varup$ then goto 902
    next i
    nofilefl = 0
'
    close #2
    return
'
902 '
'
'   Variable was found, so set the flag.
'
    entrynum = cvi(entry$)
    nofilefl = 1
    close #2
    return
'
903 '
'
'   good variable name entered
'
    ddtrecno = ddtrecno + 1
    entry(ddtrecno) = entrynum
'
    ulxchar(ddtrecno) = x
    ulychar(ddtrecno) = y
'
'   Alarm is a variable for future different alarms.
'
    alarm(ddtrecno) = 1
'
    switch1 = 0
    stateflag = 6
    return
'
904 '
'
'   This code handles invalid variable name
'
    message$ = "Variable not found try again? Y/N [ ]"
    inputcol = 36
```

```
     gosub 29010 ' handle     pt
    'input;"",y$
     if y$ <> "Y" and y$ <> "y" then switch1 = 0
'
     return
'
910 '
'
'    This code will store away the value location.
'
     xput = x
     yput = y - 3
     if xput < 0 then xput = 0
     if yput < 0 then yput = 0
'
     ulxvalue(ddtrecno) = xput
     ulyvalue(ddtrecno) = yput
'
'    Clean-up the dot
'
     call gxor(x, y, storage, soff)
     chrh = ochrh
     chrw = ochrw
     x = 160 - chrh / 2
     y = 88 - chrw / 2
     colorflg = 0
     soff = oldoff
'
'    Put the cursor back up.
'
     call gxor(x, y, storage, soff)
     stateflag = 1
     gosub 502
'
     return
'
930 '
'
'    No variable table found
'
     gosub 29000
     close #2
     locate 23,1
     print "Variable table file was not found.";
     locate 25,1
     print "Run <Variable Table Generator>";
'
     nofilefl = 1
     for i = 0 to 1000: j = 0: next i
'
     resume next
'
950 '
'
'    Text to the screen in small format
'
     gosub 14800 ' clean up the arrow
'
     oldoff = soff
'
     gosub 29000 ' clear prompt area
     switch1 = 1
     m = 1
     textchrw = 0
     locate 23,1
     print "Enter alphanumerics, then  --'";
     locate 24,1
    'print "["; string$(37," "); "]";
     while switch1
          tkey2 = 0
          key2 = 0
953       k$ = inkey$
          if k$ = "" then 953
          if len(k$) > 1 then key2 = 0
          if asc(k$) = 8 then key2 = -8
          if asc(k$) = 32 then key2 = 40
```

```
        if asc(k$) < 123 and asc(k$) > 96 then tkey2 = asc(k$) : key2 = asc(k
) - 86
        if asc(k$) < 91 and asc(k$) > 64 then tkey2 = asc(k$) : key2 = asc(k$
 - 54
        if asc(k$) < 58 and asc(k$) > 47 then tkey2 = asc(k$) : key2 = asc(k$
 - 47
        if asc(k$) = 13 then switch1 = 0: goto 952
        locate 25,1
        print string$(39," ");
        if key2 = 0 then locate 25,1: print "Please use letters or numbers or
y"; : goto 952
'
'
        if key2 = 40 then m = m + 1
        if key2 = -8 then if m <> 0 then m = m - 1: key2 = 40
        xi = m * 5
        yi = 186
        soff = smalloff + key2 * 14
        if m <> 0 then call gpset(xi, yi, storage, soff)
        if tkey2 > 0 then m = m + 1
        if m > 60 then switch1 = 0
'
'    Branch around for error
'
952  '
'
     wend
'
'    Clean up the cursor
'
     soff = oldoff
     call gxor(x, y, storage, soff)
'

'
'    Make the text the current character
'
     xi = xi + 5
     get (5,185) - (xi, 191), boxsel
'
'    Put up the new cursor
'
        x = 0
955     put (x,y),boxsel, xor
'
'    Put in the chrh and width
'
chrw = xi - 5
chrh = 6
ymax = 170
'
stateflag = 7
'
gosub 502
'
      return
960 '
'
'    Clean-up text
'
     ymax = 199
     put (x, y), boxsel, xor
'
     chrh = ochrh
     chrw = ochrw
     x = 160 - chrw / 2
     y = 88 - chrh / 2
     call gxor(x, y, storage, soff)
'
     stateflag = 1
'
     gosub 502
'
     return
```

```
'
1000 '
'
'   if draw then pset cursor, if erase then erase cursor area else beep
'
    if stateflag = 1 then gosub 20: goto 1001
'
    if stateflag = 2 then gosub 30: goto 1001
'
    if stateflag = 3 then gosub 40: goto 1001
'
    if stateflag = 4 then gosub 900: goto 1001
'
    if stateflag = 6 then gosub 910: goto 1001
'
    if stateflag = 7 then gosub 42 : gosub 960: goto 1001
'
    if stateflag = 10 then gosub 801: goto 1001
'
    if stateflag = 11 then gosub 802: goto 1001
'
    if stateflag = 12 then gosub 1121: goto 1001
'
    if stateflag = 13 then gosub 1910: goto 1001
'
    if stateflag = 15 then gosub 1950: goto 1001
'
    if stateflag = 16 then gosub 2010: goto 1001
'
    if stateflag = 17 then gosub 2020: goto 1001
'
    if stateflag = 18 then gosub 2030: goto 1001
'
    if stateflag = 20 then gosub 1110: goto 1001
'
    if stateflag = 21 then gosub 1120: goto 1001
'
    gosub 55
'
1001 '
'
    return
'
1100 '
'
    Draw a line between two pointings
    stateflag = 20
    gosub 14800
    if firstx = 0 then firstx = x: firsty = y
    call gxor(x, y, storage, soff)
'
    soff = smalloff
    chrh = 3: chrw = 3: ymax = 170
    x = firstx
    y = firsty
    call gxor(x, y, storage, soff)
'
    gosub 502
'
    return
'
1110 '
'
'
    First pointing for the line
'
    stateflag = 21
    firstx = x + 1
    firsty = y + 1
    gosub 502
'
    return
'
1120 '
'
'
    Second point for a line
```

```
'
     secondx = x + 1
     secondy = y + 1
     message$ = "Choose a color and press RED"
     stateflag = 12
     ymax = 199
'
     gosub 800
'
     return
'
1121 '
'
'    get the color and draw the line
'
     number = int(abs(x - 1) / 80)
'
     gosub 14800
'
     line (firstx, firsty) - (secondx, secondy), number
'
'    Keep the last line pointings.
'
     firstx = secondx - 1
     firsty = secondy - 1
'
     stateflag = 1
     colorflg = 0
'
     call gxor(x, y, storage, soff)
'
     gosub 502
'
     return
'
1700 '
'
'    Load an existing screen
'
     nofilefl = 0
     inputcol = 22
     message$ = "Enter screen name:  [           ]"
     gosub 29010
     input; "", file$
     file$ = file$ + ".scr"
     gosub 1710
     on error goto 31300
'
'    Error on opening the screen file.
'
     if nofilefl <> 0 then: gosub 502: return
     call gxor(x, y, storage, soff)
     def seg = &hb800
     bload file$,0
     soff = oldoff
     chrh = ochrh
     chrw = ochrw
     call gxor(x, y, storage, soff)
     gosub 502
'
     return
'
1710 '
'
'    Check for existence of the screen
'
     on error goto 1711
     open file$ for input as #3
     close #3
     return
'
1711 '
'
'    No file found
'
```

```
        gosub 29000
        locate 23,1
        print "File "; file$; " was not found.";
        for i = 0 to 10000: j = 0: next i
  '
        nofilefl = 1
  '
        resume next
  '
 1800 '
  '
  '     File the dynamic display table away on disk
  '
        gosub 14800 ' reset the cursor
        gosub 29000 ' clear prompt area
        if ddtrecno = 0 then gosub 1850: return
        call gxor(x, y, storage, soff) ' clean up the cursor
        switch1 = 1
        while switch1
             message$ = "Please enter the display name[          ]"
             inputcol = 31
             gosub 29010
             input; "",file$
             if file$ <> "" then gosub 1810
  '
        wend
  '
        call gxor(x, y, storage, soff) ' put up the old cursor
        stateflag = 1
        gosub 502
  '
        return
  '
 1810 '
  '
  '     File the ddt and the screen
  '
        switch1 = 0
        nofilefl = 0
  '
  '     GET the description info. for the display directory
  '
        gosub 1815
  '
        gosub 29000 ' clear the prompt area
        locate 23,1
        print "Please check storage medium";
  '
        locate 25,1
        print "Then press any key.";
 1811 if inkey$ = "" then 1811
  '
        ddt$ = "test"
        on error goto 1820
        open ddt$ for output as #3
        on error goto 31300
        close #3
        if nofilefl > 0 then return
        KILL DDT$
        if nofilefl > 0 then return
  '
        ddt$ = FILE$ + ".DDT"
        open ddt$ as #3 len = 16
        if nofilefl > 0 then return
        field #3, 2 as entry$, 2 as ulxchar$, 2 as ulychar$, 2 as alarm$, 2 as ulxv
alue$, 2 as ulyvalue$, 2 as char$, 2 as fill$
  '
  '     Put up the number of records in a header rec.
  '
        lset entry$ = mki$(ddtrecno)
  '
        put #3, 1
        if nofilefl > 0 then return
```

```
'
    for i = 1 to ddtrecno
         lset entry$ = mki$(entry(i))
         lset ulxchar$ = mki$(ulxchar(i))
         lset ulychar$ = mki$(ulychar(i))
         lset alarm$ = mki$(alarm(i))
         lset ulxvalue$ = mki$(ulxvalue(i))
         lset ulyvalue$ = mki$(ulyvalue(i))
'
         j = i + 1
         put #3, j
         if nofilefl > 0 then return
'
    next i

    close #3
    if nofilefl > 0 then return
'
'   Save the display description table away
    ddt$ = "display.tab"
    open ddt$ as #3 len = 80
    if nofilefl > 0 then return
    field #3, 8 as entryname$, 70 as entry$, 2 as fill$
'
    for k = 1 to 100
         get #3, k
         if left$(entryname$,5) = "@#$%!" then 1812
    next
'
    gosub 29000
    locate 23,1
    print "Display table is full";
    for i = 0 to 9999: j = 1: next
'
    return
'
1812 '
    lset entry$ = message$
    lset entryname$ = file$
    put  #3, k
'
    close #3
'
'   Save the screen away
'
    ddt$ =  FILE$ + ".scr"
    def seg = &hb800
'
1814 bsave ddt$, 0, &h4000
'
'
    return
'
1815 '
'
'   Get the description data for the display
'
    gosub 29000
    locate 23,1
    print "Enter description on the next 2 lines."
    i = 1
    j = 24
    flag = 0
    message$ = ""
    while j < 26
         while i < 39
              locate j,i
1816          a$ = inkey$: if a$ = "" then 1816
              if len(a$) < 2 then if asc(a$) = 13 then flag = 1 else print a$;
 i = i + 1: message$ = message$ + a$ else beep
              if flag > 0 or (( i > 31 ) and ( j > 24 )) then j = 30: i = 99
         wend
         j = j + 1
         i = 1
    wend
```

```
'
     return
'
'
     return
'
1820 '
'
'    Disk error
     nofilefl = 1
     gosub 29000
     locate 23,1
     print "Disk error check disk drive B";
     for i = 0 to 10000: j = 0: next i
'
     resume next
'
1850 '
'
'    Check for save of the screen
'
     locate 23,1
     stateflag =1
     print "Only the screen will be saved.";
     beep
     for i = 0 to 9999: j = 1: next
'
     message$ = "Name of the screen:  [         ]"
     inputcol = 23
     gosub 29010
     input; "",file$
     if file$ = "" then return
     file$ = file$ + ".scr"
     call gxor( x, y, storage, soff)
     def seg = &hb800
     bsave file$, 0, &h4000
     call gxor( x, y, storage, soff)
'
     return
'
1900 '
'
'    circle
'
     colorflg = 1   'keep 'em above the 23rd parallel
     stateflag = 13 'prompt for a pointing
'
     call gxor(x,y,storage,soff)
     soff = smalloff
     chrh = 3
     chrw = 3
     call gxor(x,y,storage,soff)
'
     gosub 502
'
     return
'
1910 '
'
'    more circle
'
     stateflag = 14
     call gxor(x, y, storage, soff)
     gosub 502
     count = 3
     color1 = 2
     switch1 = 1
     x = x + 1
     y = y + 1
     circle (x, y), count, color1
     while switch1
          key1 = 0
          k$ = inkey$
          if k$ <> "" then if len(k$) > 1 then key1 = asc(right$(k$,1)) else ke
1 = asc(k$)
```

```
        if key1 = 68 then switch1 = 0
        if key1 = 67 then color1 = color1 + 1: if color1 > 3 then color1 = 1
        button = 0
        if key1 = 43 then button = 1
        circlex = x - count
        circley = y - count
        x1 = x + count
        y1 = y + count
        get (circlex, circley) - (x1,y1), boxsel
        put (circlex, circley), boxsel, xor
        if button = 1 then count = count + 1
        if count >= 30 then count = 30
        circle (x, y), count, color1
    wend
    button = 0
'
    message$ = "Point to the color to fill the circle"
    stateflag = 15
    put (circlex, circley), boxsel, pset
    circlex = x + 1
    circley = y + 1
'
    gosub 502
    pfflag = 1
    gosub 810
'
    return
'
1950 '
'
'   put up the circle and fill it appropriately
'
    newcol = int(abs(x - 1) / 80)
'
    paint (circlex, circley), newcol, color1
'
    colorflg = 0
    stateflag = 1
    gosub 14800
'
    gosub 502
'
    return
'
2000 '
'
'   Draw a box
'
    colorflg = 1
    call gxor(x, y, storage, soff)
    soff = smalloff
    chrw = 3
    chrh = 3
    stateflag = 16
    gosub 502
    pfflag = 1
    call gxor(x, y, storage, soff)
'
    return
'
2010 '
'
'   more box
'
    stateflag = 17
    fx = x + 1
    fy = y + 1
    gosub 502
    pfflag = 1
'
    return
'
2020 '
'
```

```
'
    more box
'
    sx = x + 1
    sy = y + 1
'
    call gxor(x, y, storage, soff)
'
    stateflag = 18
    message$ = "Point to the color to fill the box with"
    gosub 810
'
    return
'
2030 '
'
'   more box
'
    stateflag = 1
'
    newcol = int(abs(x - 1) / 80)
'
    line (fx,fy) - (sx,sy), newcol, BF
'
    colorflg = 0
    gosub 14800
    gosub 502
'
    return
'
14000 '
'
'   Get pointer from symbol table and initialize chrh & chrw
'   Pass:  symnum = symbol table number
'
        symbnum = ( symnum + 1) * 2 + symbtoff
'
        def seg = storage
        soff = peek(symbnum) + 256 * peek(symbnum + 1)
        soff = soff + offset2 + symbtoff
        oldoff = soff
'
'   set up new offset to symbol table proper
'
'   Get new symbol's height and width
'
        chrw = peek(soff) + 256 * peek(soff + 1)
        chrh = peek(soff+2) + 256 * peek(soff + 3)
        chrw = chrw / 2
        def seg
'
    return
'
14800 '
'
'   clean-up DEGREES cursor
'
'
    call gxor(x, y, storage, soff)
'   'Put up the old cursor.
'
    chrh = ochrh
    chrw = ochrw
    soff = oldoff
'
    x = 160 - chrw / 2
    y = 88 - chrh / 2
'
    call gxor(x, y, storage, soff)
'
    return
'
14999 '
'
'   Data statements (initially only for change cursor)
```

```
'
'    Newcolor bit masks
'
data 0, 0, 0, 0, 64, 16, 4, 1, 128, 32, 8, 2, 192, 48, 12, 3
'
'    Original color to be changed bit masks
'
'    Blue:
'
data 192, 0, 48, 0, 12, 0, 3, 0
'
'    Green:
'
data 192, 64, 48, 16, 12, 4, 3, 1
'
'    Red:
'
data 192, 128, 48, 32, 12, 8, 3, 2
'
'    White:
'
data 192, 192, 48, 48, 12, 12, 3, 3
'
15000 '
'
'  This code enables a program to switch to the color monitor
'
     def seg = 0
     a = peek(&h410)
     width 80
     poke &h410, (a and &hcf) or &h20
     width 40
     screen 1
     screen 0
     locate ,,1,6,7
     screen 1
     color 16, 0
     cls
     key off
     def seg
'
     return
'
22000 '
'
'  This will get the profile settings for the joystick
'
     def seg = storage
     xvar = peek(2) + 256 * peek(3)
     yvar = peek(4) + 256 * peek(5)
     if xvar = 0 then joystick = 0 else joystick = 1
'
     def seg
'
     return
'
29000 '
'
'    Clear the prompt area
'
     locate 23,1
     print string$(39," ");
'
     locate 24,1
     print string$(39," ");
'
     locate 25,1
     print string$(39," ");
'
     return
'
29010 '
'
```

```
'     Subroutine to handle prompts on line 23
'
'     Clear the prompt area
'     prompt on line 23
'     column = 1
'     message$ = prompt
'     inputcol = column number of the input
'
      gosub 29000
'
      locate 23,1
      print message$;
      locate 23, inputcol
'
      return
'
30000 '
'
'     turn off all function keys
'
      for i = 1 to 10
           key(i) off
      next i
      for i = 1 to 10
           key i,""
      next i
      return
'
31000 '
'
'     Quadrant 1 - 6 checker
'
      if x < 50 then quadnew = 1
      if x > 49 and x < 125 then quadnew = 2
      if x > 124 and x < 173 then quadnew = 3
      if x > 172 and x < 229 then quadnew = 4
      if x > 228 and x < 265 then quadnew = 5
      if x > 264 then quadnew = 6
'
      gosub 31200
'
      return
'
31100 '
'
'     Quadrant 7 - 11 checker
'
      if x < 50 then quadnew = 7
      if x > 49 and x < 118 then quadnew = 8
      if x > 117 and x < 173 then quadnew = 9
      if x > 172 and x < 226 then quadnew = 10
      if x > 225 then quadnew = 11
'
      gosub 31200
'
      return
'
31200 '
'
'     invert the proper areas
'
      if initflag > 0 and quadnew = quadold then return
'
'     If not the first then clean up the old one.
'
      if initflag <> 0 then get (olda, oldb) - (oldc, oldd), boxsel: put (olda,
ldb), boxsel, preset
'
      if quadnew > 0 and quadnew < 7 then b = 183: d = 191
      if quadnew > 6 then b = 192: d = 199
      if quadnew = 1 then a = 0: c = 49
```

```
     if quadnew = 2 then a = 50: c = 124
     if quadnew = 3 then a = 125: c = 172
     if quadnew = 4 then a = 173: c = 228
     if quadnew = 5 then a = 229: c = 264
     if quadnew = 6 then a = 265: c = 319
     if quadnew = 7 then a = 0: c = 49
     if quadnew = 8 then a = 50: c = 117
     if quadnew = 9 then a = 118: c = 172
     if quadnew = 10 then a = 173: c = 225
     if quadnew = 11 then a = 226: c = 319
'
'    if first time through set the initial state.
'
     get (a,b) - (c,d), boxsel: put (a,b), boxsel, preset
     olda = a: oldb = b: oldc = c: oldd = d
     quadold = quadnew
     initflag = 1
'
     return
'
31300 '
'
'    All error handler
'
     message$ = "System Error, continue? Y/N [ ]"
     inputcol = 30
     gosub 29010
     input;"",y$
     if y$ <> "Y" and y$ <> "y" then gosub 32000
     stateflag = 1
     gosub 502
     resume next
'
31400 '
'
'    Put up the Help screen
'
     def seg = &hb000
     bload "help.scr",0
     def seg
'
     return
'
32000 '
'
'    Prompt for sureness....
'
     message$ =  "Are you sure? Y/N [ ]"
     inputcol = 20
     gosub 29010            ' prompt
     input;"",y$
     if y$ <> "Y" and y$ <> "y" then gosub 14800: stateflag = 1: gosub 502: ret
rn
     gosub 29000
'
'    return to menu
'
     clear
     run "engineer.exe"
     end
```

I claim:

1. A computer system for providing an interactive graphics display comprising:

means for providing a table of selectable cursor graphic characters;

means for selecting one of said cursor graphic characters as the current cursor symbol;

means for displaying the selected cursor graphic character;

means for moving the displayed cursor graphic character on said means for displaying; and means for fixing an image of the currently displayed cursor graphic character on said means for displaying at one or more locations to generate a graphic display, said means for moving thereafter being capable of moving the currently displayed cursor graphic character to another location on said means for displaying.

2. A computer system of the type including processor means, memory means for storing a program for controlling said processor means and data which is processed by said processor means under the control of said program, and input and output adapter means to which various input and output devices may be connected, said system further comprising:

interactive all points addressable display means connected to an output adapter means for displaying graphic data processed by said processor means;

cursor positioning means connected to an input adapter means for providing an input to said processor means indicating a desired direction of movement of a cursor displayed on said all points addressable display means;

said processor means being responsive to said cursor positioning means for controlling said all points addressable display means for displaying graphic data at any addressable point on said display means, said memory means storing at least one table of selectable cursor graphic characters, said processor means including:

means for selecting a cursor graphic character from said table, the selected character being displayed on said all points addressable display means as the cursor character and movable to any point on said display means by said cursor positioning device; and means for fixing the selected cursor graphic character at a desired point on said all points addressable display means thereby facilitating the generation of a graphics display including any arbitrary selection of cursor characters from said table, said cursor positioning means being capable of moving the currently displayed cursor graphic character to another location on said all points addressable display means immediately after an image of said selected cursor graphic character has been fixed at a desired point on the display.

3. The computer system for providing an interactive graphics display as recited in claim 1 wherein said means for displaying includes an all points addressable graphics display and a display buffer for addressing said all points addressable graphics display and wherein said means for fixing includes means for reading current cursor position and character data into said display buffer.

4. The computer system for providing an interactive graphics display as recited in claim 3 wherein said means for moving includes a joy stick and said means for fixing further includes a trigger button associated with said joy stick.

5. A computer system for providing an interactive graphics display comprising:

an all points addressable display;

processor means for controlling said all points addressable display;

cursor positioning means connected to an input of said processor means for providing direction of movement data to said processor means of a cursor symbol displayed on said all points addressable display, said processor means being responsive to said direction of movement data for controlling the movement of said cursor symbol on said all points addressable display;

said processor means including means for displaying the outline of a geometric figure as said cursor symbol on said all points addressable display, said outline being movable by said cursor positioning means; and means associated with said cursor positioning means for erasing all character data within said outline while said outline is positioned at or moved through a desired location on said all points addressable display.

6. The computer system for providing an interactive graphics display as recited in claim 5 wherein said processor means further includes a display buffer for addressing said all points addressable display and said means for erasing the data within said outline includes means for setting all data points in said display buffer coresponding to those data points within said outline when said outline is positioned at or passes through a desired location on said all points addressable display to zeros.

7. The computer system for providing an interactive graphics display as recited in claim 6 wherein said cursor positioning means includes a joy stick and said means for erasing further includes a trigger button associated with said joy stick.

8. A computer system of the type including processor means, memory means for storing a program for controlling said processor means and data which is processed by said processor means under the control of said program, and input and output adapter means to which various input and output devices may be connected, said system further comprising:

interactive all points addressable display means connected to an output adapter means for displaying graphic data processed by said processor means;

cursor positioning means connected to an input adapter means for providing an input to said processor means indicating a desired direction of movement of a cursor displayed on said all points addressable display means;

said processor means being responsive to said cursor positioning means for controlling said all points addressable display means for displaying graphic data at any addressable point on said display means, said processor means including:

means for displaying the outline of a geometrical figure as the current cursor, said outline simulating an eraser, alphanumeric and graphics characters displayed within said outline being clearly visible and said outline being movable by said cursor positioning means; and means associated with said cursor positioning means for erasing all character data within said outline when said outline is positioned at or passes through a desired location on said all points addressable display means.

9. The computer system as recited in claim 8 wherein said means for displaying said outline of a geometric figure includes means for increasing or decreasing at least one dimension of the geometric figure so that the area of the graphics display on said all points addressable display which is erased is correspondingly increased or decreased.

* * * * *